United States Patent [19]
Breed

[11] 3,750,389
[45] Aug. 7, 1973

[54] LIQUID ANNULAR ORIFICE DASHPOT TIMER WITH INTERTIAL EFFECTS

[76] Inventor: David S. Breed, Box 270 R.D. 2, Hillcrest Rd., Boonton Twp., N.J. 07005

[22] Filed: Feb. 16, 1971

[21] Appl. No.: 115,442

[52] U.S. Cl.................. 58/144, 58/2, 188/316, 267/114
[51] Int. Cl. ............................................. G04f 1/00
[58] Field of Search.................... 188/316, 322, 288, 188/1 B; 267/114, 116, 129, 138, 140; 58/2, 144

[56] References Cited
UNITED STATES PATENTS

| | | | |
|---|---|---|---|
| 1,700,477 | 1/1929 | Goode | 188/1 B |
| 2,633,368 | 3/1953 | Ross | 188/1 B X |
| 2,714,927 | 8/1955 | Stern et al. | 58/144 |
| 2,723,846 | 11/1955 | Holder et al. | 267/114 |
| 874,150 | 12/1907 | Young | 293/DIG. 3 |
| 1,539,196 | 5/1925 | Litten | 188/288 |
| 3,563,024 | 2/1971 | Breed | 58/144 X |
| 3,603,072 | 9/1971 | Breed | 267/114 X |

FOREIGN PATENTS OR APPLICATIONS

| | | | |
|---|---|---|---|
| 554,983 | 7/1943 | Great Britain | 188/322 |
| 486,689 | 11/1953 | Italy | 188/316 |

Primary Examiner—George E. A. Halvosa
Attorney—Kane, Dalsimer, Kane, Sullivan

[57] ABSTRACT

The dashpot of this invention includes the substantially cylindrical cylinder in which travels a piston having a diameter slightly less than that of the interior of the cylinder. A liquid or modified liquid defines the medium in the cylinder in which the piston is adapted to travel. The flow ingenerated in the cylinder is predominantly a pressue flow with the shear flow being relative insignificant. The flow is also at sufficiently high Reynolds numbers such that inertial effects are present. The device of the prsent invention operates in the lubrication regime whereby relatively small timers are capable of providing time delays of up to several seconds or more.

20 Claims, 5 Drawing Figures

PATENTED AUG 7 1973 3,750,389

INVENTOR
DAVID S. BREED
BY
KANE, DALSIMER, KANE, SULLIVAN & KURUCZ
ATTORNEY

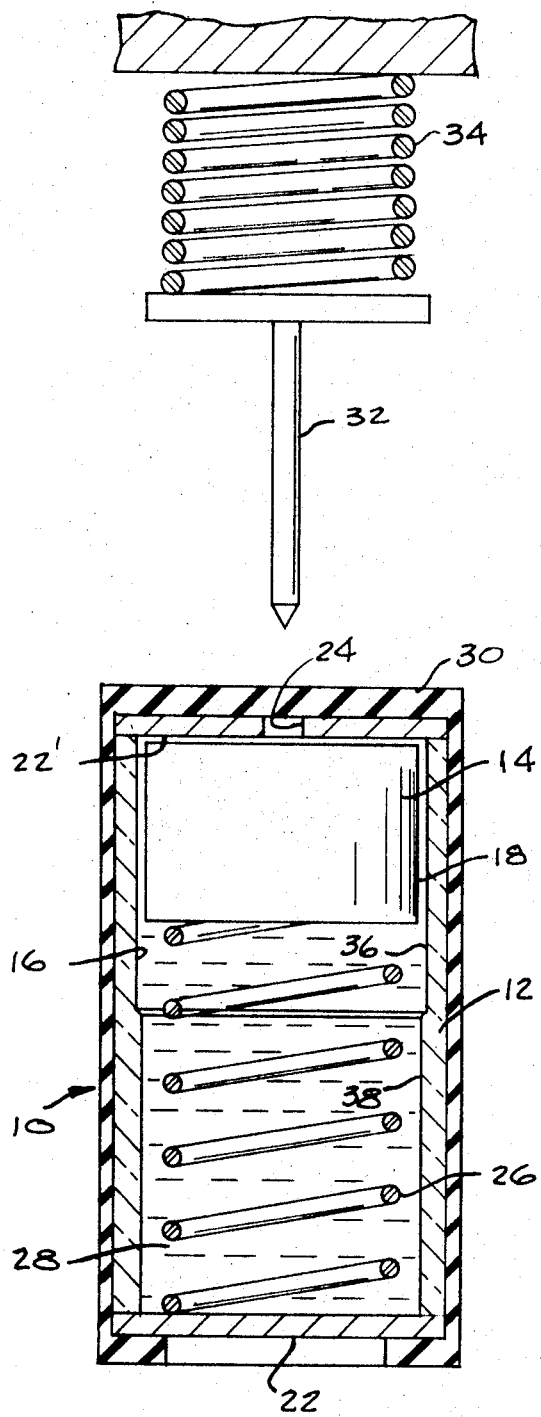
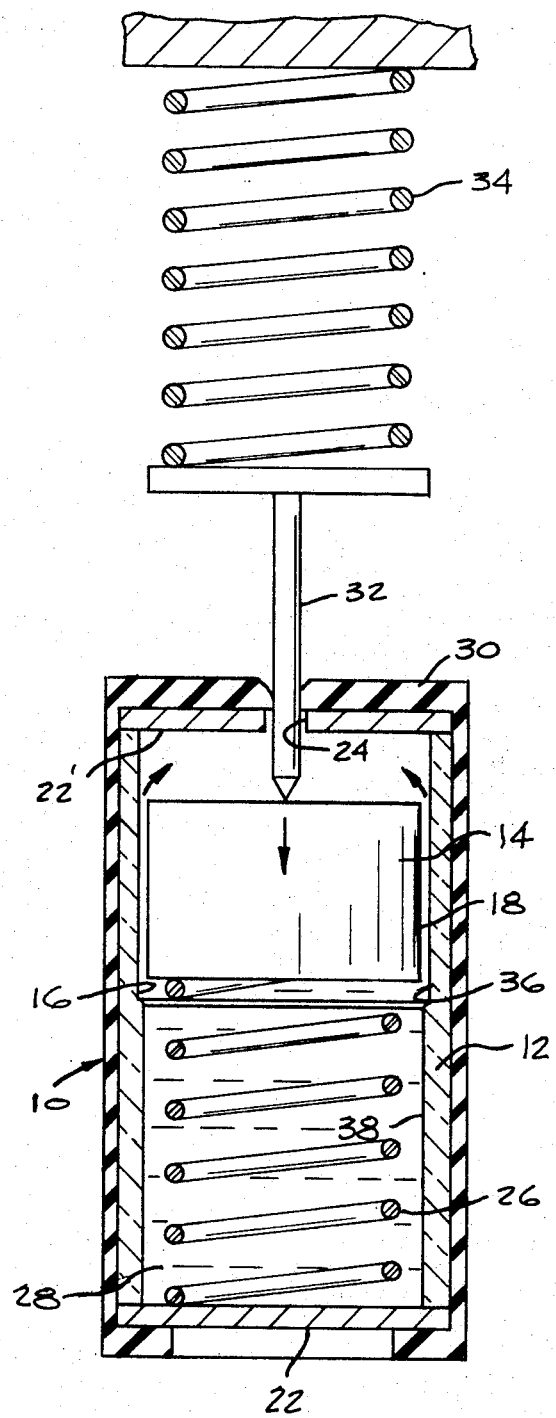

LIQUID ANNULAR ORIFICE DASHPOT TIMER WITH INERTIAL EFFECTS

BACKGROUND OF THE INVENTION

The subject invention relates to a liquid annular orifice dashpot which utilizes the clearance between a ball or axially symmetric piston and an interior cylindrical wall as an orifice through which the liquid or modified liquid is metered. Dashpot utilizing air as the metering fluid are known in the art and are described in U.S. Pat. No. 3,171,245. Such air dashpots are finding wide acceptance for certain time delays or where available space is no problem. Applications requiring relatively long delays ranging up to several days, months or longer times or where space allocations are of an absolute minimum or both are described in pending patent applications Ser. Nos. 816,132, filed Dec. 9, 1968, now U.S. Pat. No. 3,563,023, granted on Feb. 16, 1971 and 1,340, filed Jan. 8, 1970, now U.S. Pat. No. 3,603,072, granted on Sept. 7, 1971. For such long period delays the liquid dashpot timers of those applications have found to be eminently successful and capable of yielding time delays ranging from a few seconds to months or more. It has been found that substantial improvements in the variation in time delay over the temperature ranging from −65°F to +160°F can be achieved for short delays if the device can be operated at sufficiently high Reynolds numbers for inertial flow effects to come into play. Thus, whereas in the dashpot timers of the above applications viscous forces predominated over inertial forces, the dashpot timer of this invention uses a flow regime whereby inertial forces are important and in some cases even dominate over the viscous forces. These inertial effects arise due to the acceleration of the fluid undergoing pressure flow through the clearance. The piston may or may not be accelerating but the effect of its inertia is negligible.

Where necessary, temperature compensation is achieved in these dashpots in the manner as described in the above mentioned pending patent applications. However, for these dashpots the fluid or modified fluids used tend to be of very low viscosity and are frequently chosen from a group of bromine based liquids or from the ketones, such as, methyl ethyl ketone. The viscosities of such fluids vary considerably less over the temperature range than do for example the silicones. This coupled with the fact that when inertial effects are present the dependency of the time delay on the viscosity is substantially reduced, permits the use of relatively large clearances, which permits a dramatic reduction in the required tolerances. Out-of-roundness and taper in the cylinder for example which heretofore typically had to be controlled to 0.000025 inch or better, now can be relaxed significantly greatly improving the producibility of the cylinder and consequently reducing its cost. Further, the range of materials which is now available for the piston and cylinder is greatly increased. For example, successful dashpots have been constructed using plastic balls and metal cylinders.

The existence of inertial effects has the further advantage of substantially reducing the dependency of the time delay on the applied force. For modified liquid dashpots described in U.S. Pat. No. 3,603,072 where operation is in the regime where viscous forces dominate, the time delay tends to be quite sensitive to the applied force. This is due to the fact that most modified liquids have a viscosity which decreases with increasing shear rate or shear stress. Thus, if the applied force on such a dashpot is doubled, the velocity of the ball will typically increase by considerably more than a factor of two due to the fact that the viscosity of the modified liquid has decreased. In dashpots wherein inertial effects are present, however, the fluid used is quite Newtonian in its viscosity behavior. In a case where the inertial forces dominate over the viscous forces, the velocity of the ball is proportional to the square root of the applied force and in cases where the inertial forces are only marginally significant the piston velocity will vary with the first power of the applied force. For dashpot timers of the present invention, therefore, the velocity of the ball will vary by some function of the applied force lying between the first power and the square root. This fact leads to greatly improved accuracy in the liquid annular orifice dashpot timer. In most mechanisms where such a timer is used, there is always a component of the force which is unknown. This component can be due to frictional effects or to manufacturing tolerances in the spring which supplies the force to operate the dashpot timer.

An understanding of the particular nature of the flow past a ball or axi-symmetric piston as it descends along the wall of the cylinder is important in determining the predictability and accuracy of the rate of descent. The types of flow envisioned in these dashpots is described in the mentioned copending patent applications and in the textual treatment of creeping motions in *Boundary Layer Theory*, McGraw-Hill series of mechanical engineering by Hermann Schlicting, 4th edition, published by McGraw-Hill Book Company, Inc., New York, New York, and particularly Chapters 4 and 6 thereof, all of which is incorporated herein by reference. The particular effects of the inertial terms can be determined through a procedure described on page 114 of this reference which involves a step-by-step numerical calculation. Alternately, for a particular application the behavior of a given dashpot design can be determined experimentally.

SUMMARY OF THE INVENTION

Briefly, this invention consists of a piston and cylinder of the type described earlier with a liquid or modified liquid substantially filling the cylinder with the clearance between the piston and cylinder serving as the orifice through which the liquid or modified liquid must flow and in which the flow generated in this clearance is predominately pressure flow with inertial effects being present.

One of the primary objects of this invention is to provide a liquid annular orifice dashpot timer having a nearly constant time delay from −65°F to +160°F.

Another object of this invention is to provide a liquid annular orifice dashpot timer which is comparatively insensitive to minor variations in the driving force.

A further object of this invention is to provide a liquid annular orifice dashpot timer for very accurate, short time delays.

Another object of this invention is to provide a liquid annular orifice dashpot timer which is relatively insensitive to changes in the clearance.

Another object of this invention is to provide a liquid annular orifice dashpot timer to be used for arming delays for gun ammunition.

Another object of this invention is to provide a liquid annular orifice dashpot timer to be used as a self-destruct delay for gun ammunition.

Other objects and advantages of this invention will be made apparent as the description progresses.

BRIEF DESCRIPTION OF THE DRAWINGS

FIG. 4 is a longitudinal sectional view illustrating the dashpot employed in an exemplary embodiment involving a puncturing needle prior to the initiation of the time delay sequence; and, FIG. 5 is a view similar to FIG. 4 showing the device after the delay sequence has been initiated.

DESCRIPTION OF THE PREFERRED EMBODIMENTS

Figure 1:
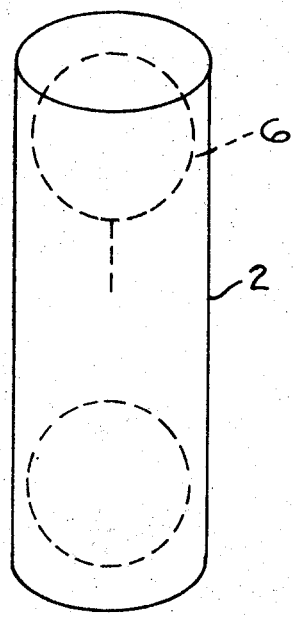
FIG. 1 is diagramatic prospective view of a dashpot timer incorporating the teachings of this Invention utilizing a spherical piston, the initial and terminal position of which for the prescribed time delay being shown in dotted lines.
Figure 2:
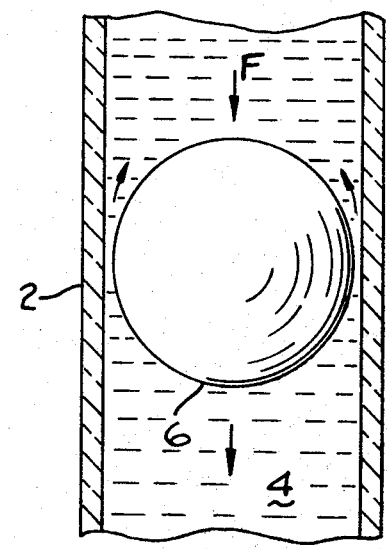
FIG. 2 is an enlarged fragmentary longitudinal sectional view of this dashpot showing the internally disposed spherical piston travelling through the selected liquid under an applied force.
Figure 3:
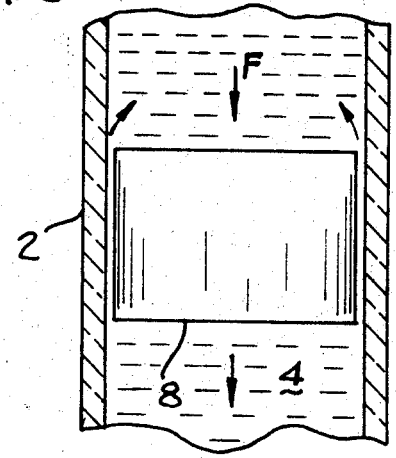
FIG. 3 is a similar view showing a cylindrical piston.

Referring now to FIGS. 1 to 3 a dashpot timer of this invention will include an outer cylinder 2 having a contained liquid or modified liquid 4 therein through which a piston is adapted to travel under applied fore F. This piston may assume the form of a sphere 6 or a cylinder 8. The piston also defines with the inner surface of the cylinder a relatively small annular orifice through which the liquid is adapted to pass.

Referring to the embodiment of FIGS. 4 and 5 a dashpot timer incorporating the features of the present invention is illustrated generally at 10. The timer 10 includes a cylinder 12 in which a cylindrical piston 14 is slidably disposed. The dimensional tolerances on the interior wall of 16 of the cylinder 12 and the exterior wall 18 of piston 14 provides for an annular orifice 20 through which a fluid in liquid form is adapted to flow wherein inertial effects are present.

The cylinder 12 is closed at its ends by plates 22 and 22'. The upper plate 22' has an aperture 24 positioned thereof for purposes hereinafter described. A spring 26 may be positioned within the cylinder and is designed to retain the piston 14 at the upper end of the cylinder 16 in the manner shown in FIG. 4. Such a spring would not be required if the fluid is a modified fluid such as described in U.S. Pat. No. 3,603,072. A liquid 28 having the prescribed properties fills the remaining portion of the cylinder.

In order to seal the liquid 28 in the cylinder a rubber boot 30 is designed to overlie the upper plate 22'. If desired, the boot could completely encapsulate the cylinder or substantially all of it as shown in the drawings. Other types of seals could of course be utilized; such as, one utilizing a metal cup with a crimped top, such as the common "tin can" used for preserving food.

A plunger 32 is mounted externally of the cylinder in alignment with aperture 24 of plate 22'. The plunger is desired to travel along its axis and in the illustrated embodiment is powered by a spring 34.

Upon initiation of the timing sequence a suitable mechanism (not illustrated) releases the plunger whereby it penetrates the boot 30 and enters the cylinder through aperture 24. The plunger 32 then strikes the piston 14 which is retained adjacent to the aperture 24 by the spring 25. By design the force exerted by the spring 34 is somewhat larger than that exerted by the spring 26 such that the piston descends along the cylinder at a controlled rate. Thus, the distance which the plunger 32 has travelled along its axis provides a convenient measure of elapsed time. Through the use of conventional mechanisms the plunger can be utilized to trigger various devices such as an arming mechanism or self-destruction mechanism for gun ammunition.

The critical parameter for determining analytically whether inertial effects will be present or not is the Reynolds number based upon the clearance. This Reynolds number measures the ratio of inertial to viscous forces for an element of fluid moving transverse to the main flow in the clearance. Considering a small cylinder of fluid having an axial length L in the direction of flow, a circumference $2\pi R$, a thickness equal to the mean radial clearance H and having a velocity V in the direction of flow, the inertial force on such an element is:

$$F_i = \rho L \, (2\pi R) \, H \, V \, (dV/dR) \tag{1}$$

and the viscous forces on this element of fluid are:

$$F_v = (\mu V 2/H) L \, (2\pi R) \tag{2}$$

The Reynolds number then is the ratio of $F_i$ to $F_v$ and becomes:

$$R_e = (\rho H^2/2\mu) \, (dV/dR) \tag{3}$$

Since the exact form of the velocity distribution is unknown due to the presence of inertial effects, an approximation can be made by assuming a constant velocity gradient equal to the velocity at the center of the clearance divided by one-half the clearance. Thus, the Reynolds number becomes $$R_e = (\rho V_o H/\mu) \tag{4}$$

This then can be related to the ball velocity as follows:

$$R_e = (\rho R V')/(2\mu) \tag{5}$$

Where:
$\rho$ = density of fluid
$R$ = radius of cylinder
$V'$ = velocity of piston
$\mu$ = viscosity of fluid The value of this Reynolds number at which the inertial effects dominate must be determined experimentally. From the literature on lubrication one would expect some inertial effects taking place when this Reynolds number exceeds 1 with significant inertial effects occurring at a value of around 50 and with dominate inertial effects taking place with a value above 200.

The above analysis has been based upon centered travel of a spherical piston in the cylinder. The situation becomes more complex when the piston travels down the side of the cylinder and even more complex when a cylindrical piston is used which is cocked in the cylinder. The best approach for any given application is therefore an experimental one where measurements of the piston velocity versus applied force and variations in piston velocity versus temperature could be used to indicate the presence of inertial effects.

For most devices contemplated the radius would be less than about one-half inch. The pressure could vary from about 5 psi to several thousand psi. The clearance H would probably never exceed 0.05 inches. The viscosity $\mu$ could vary from 0.2 to 100 centipoise, however, for most devices the upper limit would be about 5 centipoise. Fluids chosen would usually be from the family of fluids containing bromine and from the ketones; both groups of which show minimum viscosity change with temperature and are usable over the extended temperature range of −65°F to +160°F. The bromine fluids have the advantage of having a higher density, however, they also tend to be more expensive.

For some applications, some degree of temperature compensation would be necessary. This would involve choosing materials for the piston and cylinder having different thermal expansion coefficients.

The cylinder 12 could be made from most any material with a glass material being most desireable when the clearance H is small. The plates could be made separately or either one could be integrally formed with the cylinder.

Thus, the numerous aforementioned objects and advantages among others are most effectively attained. Although two preferred embodiments and applications have been described, discussed and illustrated herein it should be understood that this invention is in no sense limited thereby but its scope is to be determined by that of the appended claims.

I claim:

1. A liquid annular orifice dashpot timer of the class described comprising a cylinder having a substantial cylindrical interior wall said cylinder having sealing means closing at least one end thereof, a solid piston disposed in said cylinder and having an outer diameter slightly less than the diameter of said interior wall, whereby a substantially annular orifice is defined between the piston and cylinder, the piston radius being less than about one-half inch, the orifice being less than 0.025 inch; a liquid or modified liquid having a viscosity valve from 0.1 to 5 centipoise completely filling the remaining portion of said cylinder such that during operation of said dashpot the flow of said fluid is at least partially limited by the inertia of said fluid in the lubrication regime which involves Reynolds numbers greater than 1, and a plunger positioned externally of said cylinder and being adapted to puncture said sealing means at one end of said cylinder to exert a force on said piston to move said piston at a prescribed rate; and means for responding to a predetermined amount of movement of the piston in the cylinder.

2. The timer as set forth in claim 1 wherein a spring is positioned in said cylinder to urge said piston toward the end of said cylinder adjacent to said plunger.

3. The timer as set forth in claim 2 wherein said sealing means at the end of said cylinder adjacent to said plunger comprises a rubber boot.

4. A liquid annular orifice dashpot timer comprising a cylinder having a substantially cylindrical interior wall, a solid piston disposed in said cylinder and having an outer diameter slightly smaller than the diameter of said interior wall whereby a substantially annular orifice is defined between the piston and cylinder, the piston radius being less than about one-half inch, the orifice being less than 0.025 inch; a liquid or modified liquid of relatively small viscosity in the cylinder through which the piston is adapted to move at a prescribed rate with the flow of the liquid being partially inertial flow in the lubrication regime which involves Reynolds numbers greater than 1, the viscosity being a value from 0.2 centipoise to 5 centipoise; and means for responding to a predetermined amount of movement of the piston in the cylinder.

5. The invention in accordance with claim 4 wherein the liquid is selected from a group consisting of fluids containing the element bromine.

6. The invention in accordance with claim 4 wherein the liquid is selected from a class of chemical compounds known as the ketones.

7. The invention in accordance with claim 4 wherein the viscosity of the liquid changes by a factor of less than 10 to 1 over the temperature range of −65°F to +160°F.

8. The invention in accordance with claim 4 wherein the piston is cylindrical and is cocked relative to the cylinder during its travel therein.

9. The invention in accordance with claim 4 wherein the velocity of travel of the piston varies as an exponent of the applied force wherein the exponent has a value less than 1 and equal to or greater than one-half.

10. The invention in accordance with claim 4 wherein inertial forces dominate over viscous forces.

11. A timer as set forth in claim 4 wherein the interior wall of the cylinder has a reduced portion at one end thereof such that inertial effects take place during at least one portion of the piston travel.

12. The invention in accordance with claim 4 wherein the Reynolds number is greater than 50.

13. The invention in accordance with claim 4 wherein the Reynolds number is greater than 200.

14. The invention in accordance with claim 4 wherein the piston is substantially spherical.

15. The invention in accordance with claim 14 wherein the force on the piston divided by the cross section area of the piston is of a value of about 5 psi to several thousand psi.

16. The invention in accordance with claim 4 wherein the piston is substantially cylindrical.

17. The invention in accordance with claim 16 wherein the force on the piston divided by the cross section area of the piston is of the value of about 5 psi to several thousand psi.

18. The invention in accordance with claim 16 wherein the liquid is selected from a group of fluids containing the element bromine.

19. The invention in accordance with claim 16 wherein the liquid is selected from a class of chemical compounds known as the ketones.

20. The invention in accordance with claim 16 wherein the viscosity of the liquid changes by a factor of less than 10 to 1 over the temperature range of −65°F to +160°F.

* * * * *

Disclaimer 3,750,389.—*David S. Breed*, Boonton Township, N.J. LIQUID ANNULAR ORIFICE DASHPOT TIMER WITH INERTIAL EFFECTS. Patent dated Aug. 7, 1973. Disclaimer filed Apr. 3, 1973, by the inventor.

Hereby disclaims the portion of the term of the patent subsequent to Feb. 16, 1988.

[*Official Gazette October 16, 1973.*]